(12) United States Patent
Kairali et al.

(10) Patent No.: US 12,086,166 B1
(45) Date of Patent: Sep. 10, 2024

(54) INCREMENTAL CLUSTERING OF CONTINUOUS FLOW DATA STREAMS TO PRESERVE DATA CONTINUITY

(71) Applicant: International Business Machines Corporation, Armonk, NY (US)

(72) Inventors: Sudheesh S. Kairali, Kozhikode (IN); Binoy Thomas, Kozhikode (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/180,928

(22) Filed: Mar. 9, 2023

(51) Int. Cl.
*G06F 16/00* (2019.01)
*G06F 16/25* (2019.01)
*G06F 16/28* (2019.01)

(52) U.S. Cl.
CPC .......... *G06F 16/285* (2019.01); *G06F 16/254* (2019.01)

(58) Field of Classification Search
CPC ........ G06F 16/35; G06F 16/285; G06F 16/93; G06F 16/2465; G06F 16/283; G06F 16/36; G06F 40/30; G06F 16/316; G06F 16/951; G06F 40/289; G06F 16/3329; G06F 16/90335; G06F 18/23; G06F 2111/10; G06F 30/20; G06F 40/174; G06F 16/24578; G06F 40/56; G06F 16/2468; G06F 16/334; G06F 16/353; G06F 16/358; G06F 16/9535; G06F 16/9536; G06F 3/0481; G06F 16/9024; G06F 18/00; G06F 3/0482; G06F 3/04842; G06F 2218/08; G06F 16/24568; G06F 21/6209; G06F 1/163; G06F 11/07; G06F 11/0754; G06F 11/079; G06F 11/3086; G06F 16/288; G06F 18/21; G06F 18/2178; G06F 18/285;
(Continued)

(56) References Cited

U.S. PATENT DOCUMENTS

| 6,735,550 | B1 | 5/2004 | Weekley |
| 9,886,521 | B2 | 2/2018 | Wu |
| 11,016,996 | B2 | 5/2021 | Deland |
| 2006/0210052 | A1* | 9/2006 | Yamanaka .......... H04M 3/5233 379/265.06 |

(Continued)

OTHER PUBLICATIONS

Bhatnagar et al., "Clustering data streams using grid-based synopsis", Knowledge and Information Systems 41(1), Oct. 2013, 26 Pages.
(Continued)

*Primary Examiner* — Shyue Jiunn Hwa
(74) *Attorney, Agent, or Firm* — Michael O'Keefe (57) ABSTRACT

In an approach to incremental clustering of continuous flow data streams to preserve data continuity, one or more computer processors receive a definition of a first major cluster period and a definition of a first minor cluster period. One or more computer processors receive a continuous stream of data. One or more computer processors cluster the continuous stream of data, based on the definition of the first major cluster period and on the definition of the first minor cluster period. One or more computer processors determine a similarity between a first data cluster and a second data cluster, wherein the second data cluster occurs after the first minor cluster period. One or more computer processors determine whether the similarity meets a pre-defined minimum threshold of similarity. One or more computer processors increase the first minor cluster period to a second minor cluster period.

17 Claims, 3 Drawing Sheets

(58) Field of Classification Search
CPC .. G06F 2201/875; G06F 9/50; G06F 2203/00; G06F 2205/00; G06F 2218/12; G06F 9/30036; G06F 18/41; G06N 20/00; G06N 5/02; G06Q 10/109; G06Q 30/0201; G06Q 10/10; G06Q 10/1093; G06Q 10/06; H04L 67/306; H04L 12/1895; H04L 67/10
See application file for complete search history.

(56) References Cited

U.S. PATENT DOCUMENTS

| | | | |
|---|---|---|---|
| 2008/0208646 A1* | 8/2008 | Thompson | G06Q 10/10 705/7.42 |
| 2016/0212200 A1* | 7/2016 | Alonso | H04L 67/306 |

OTHER PUBLICATIONS

Chavent et al., "New Clustering methods for interval data", Computational Statistics, 2006, 21 Pages.

Dang et al., "Incremental and Adaptive Clustering Stream Data over Sliding Window", Conference Paper, Lecture Notes in Computer Science Book Series (LNISA, vol. 5690), 2009, 15 Pages.

Denyse, "Time Series Clustering—Deriving Trends and Archetypes from Sequential Data", Towards Data Science, Medium, Jul. 28, 2021, 9 Pages.

Kontaki et al., "Efficient Incremental Subspace Clustering in Data Streams", IEEE, 2006 10th International Database Engineering and Applications Symposium (IDEAS'06), Delhi, India, Dec. 11-14, 2006, 8 Pages.

Li et al., "Incremental Clustering for Trajectories", Conference: Database Systems for Advanced Applications, 15th International Conference, DASFAA 2010, Tsukuba, Japan, Apr. 1-4, 2010, Proceedings, Part II, 15 Pages.

Luhr et al., "Incremental clustering of dynamic data streams using connectivity based representative points", ScienceDirect, Data & Knowledge Engineering, vol. 68, Issue 1, Jan. 2009, 27 Pages.

Zhu et al., "Clustering of Evolving Data Stream with Multiple Adaptive Sliding Window", 2010 International Conference on Data Storage and Data Engineering, IEEE Computer Society, Feb. 2010, 6 Pages.

* cited by examiner

INCREMENTAL CLUSTERING OF CONTINUOUS FLOW DATA STREAMS TO PRESERVE DATA CONTINUITY

BACKGROUND OF THE INVENTION

The present invention relates generally to the field of data processing, and more particularly to incremental clustering of continuous flow data streams to preserve data continuity.

As the world becomes more interconnected and instrumented, there is a deluge of data coming from various software and hardware sensors in the form of continuous streams. Examples can be found in several domains, such as financial markets, telecommunications, manufacturing, healthcare, and social networks. In all these domains, there is an increasing need to gather, process, and analyze these data streams to extract insights as well as to detect emerging patterns and outliers. More importantly, this analysis often needs to be performed in near real-time. In different contextual situations, there can be different levels of network bandwidth availability. In any application landscape, there can be different types of applications, and the applications are talking to each other with upstream and downstream relationships. Thus, data is moving through a network from one application to another application on a scheduled interval. Extract/load/transform (ELT) is a data integration methodology that extracts data from one or multiple sources and loads the data into a target data warehouse. Instead of transforming the data before the data is loaded, ELT takes advantage of the target system to do the data transformation. ELT is flexible, efficient, and scalable, especially for ingesting large amounts of data, i.e., processing data sets that contain both structured and unstructured data and developing diverse business intelligence.

Time series clustering is an unsupervised data mining technique for organizing data points into groups based on their similarity. The objective is to maximize data similarity within clusters and minimize it across clusters, i.e., dividing the population of data points into a number of groups such that data points in the same groups are more similar to other data points in the same group than to data points in other groups. In simple words, the objective is to segregate groups with similar traits and assign them into clusters. Time series clustering is often used as a subroutine of other more complex algorithms and is employed as a standard tool in data science for anomaly detection, character recognition, pattern discovery, visualization of time series, etc. The need to learn structures from data in a streaming environment has been a driving force for making clustering a popular technique for knowledge discovery from data streams. Clustering is an easy way to perform many surface-level analyses that can provide quick wins in a variety of fields.

Clustering is typically applied to a large data set to categorize the data set. When a system ingests one or more continuous data streams that include a large volume of data, for example, logs from data center operations, known clustering techniques may be limited in the retention of continuity of the analysis. For example, clustering a month's worth of data produces a first result of cluster topics, while clustering two months' worth of data may produce an entirely different result. To further the example, clustering data by individual months may also produce different results, especially with respect to continuous data streams. Thus, building comparative results between various months would likely include some inaccuracy. Not knowing the time interval or period at which data continuity in a clustering-based analysis is lost can produce inaccurate analyses when trying to consider historical trends, thereby incurring additional reprocessing and storage costs.

SUMMARY

A first aspect of the present invention discloses a computer-implemented method including one or more computer processors receiving a definition of a first major cluster period and a definition of a first minor cluster period. One or more computer processors receive a continuous stream of data. One or more computer processors cluster the continuous stream of data, based on the definition of the first major cluster period and on the definition of the first minor cluster period. One or more computer processors determine a similarity between a first data cluster and a second data cluster, where the second data cluster occurs after the first minor cluster period. One or more computer processors determine whether the similarity meets a pre-defined minimum threshold of similarity. Responsive to determining the similarity does not meet a pre-defined minimum threshold of similarity, one or more computer processors increase the first minor cluster period to a second minor cluster period. The present invention has the advantage of, by comparing related group names and topic details of data clustered over a major cluster period to related group names and topic details of data clustered over a major-to-minor cluster period, the ability to establish a continuity of topics, since within the minor cluster period the change in topics may be minimal.

A second aspect of the present invention discloses a computer program product including one or more computer readable storage media and program instructions, stored on at least one of the one or more computer readable storage media, to receive a definition of a first major cluster period and a definition of a first minor cluster period. The program instructions include program instructions, stored on at least one of the one or more computer readable storage media, to receive a continuous stream of data. The program instructions include program instructions, stored on at least one of the one or more computer readable storage media, to cluster the continuous stream of data, based on the definition of the first major cluster period and on the definition of the first minor cluster period. The program instructions include program instructions, stored on at least one of the one or more computer readable storage media, to determine a similarity between a first data cluster and a second data cluster, where the second data cluster occurs after the first minor cluster period. The program instructions include program instructions, stored on at least one of the one or more computer readable storage media, to determine whether the similarity meets a pre-defined minimum threshold of similarity. The program instructions include, responsive to determining the similarity does not meet a pre-defined minimum threshold of similarity, program instructions, stored on at least one of the one or more computer readable storage media, to increase the first minor cluster period to a second minor cluster period.

A third aspect of the present invention discloses a computer system including one or more computer processors one or more computer-readable memories and one or more computer readable storage media and program instructions, stored on at least one of the one or more computer readable storage media for execution by at least one of the one or more computer processors via at least one of the one or more memories, to receive a definition of a first major cluster period and a definition of a first minor cluster period. The program instructions include program instructions, stored on at least one of the one or more computer readable storage media for execution by at least one of the one or more computer processors via at least one of the one or more memories, to receive a continuous stream of data. The program instructions include program instructions, stored on at least one of the one or more computer readable storage media for execution by at least one of the one or more computer processors via at least one of the one or more memories, to cluster the continuous stream of data, based on the definition of the first major cluster period and on the definition of the first minor cluster period. The program instructions include program instructions, stored on at least one of the one or more computer readable storage media for execution by at least one of the one or more computer processors via at least one of the one or more memories, to determine a similarity between a first data cluster and a second data cluster, where the second data cluster occurs after the first minor cluster period. The program instructions include program instructions, stored on at least one of the one or more computer readable storage media for execution by at least one of the one or more computer processors via at least one of the one or more memories, to determine whether the similarity meets a pre-defined minimum threshold of similarity. The program instructions include, responsive to determining the similarity does not meet a pre-defined minimum threshold of similarity, program instructions, stored on at least one of the one or more computer readable storage media for execution by at least one of the one or more computer processors via at least one of the one or more memories, to increase the first minor cluster period to a second minor cluster period.

In another aspect, the present invention discloses a method for removing noncritical data from data clusters, where, based on the determined similarity between the first data cluster and the second data cluster, one or more computer processors determine a portion of the continuous stream of data that does not influence the clustering. One or more computer processors determine the portion of the continuous stream of data that does not influence the clustering is noncritical. One or more computer processors remove noncritical data from a dataset. An advantage of removing noncritical data is that it improves clustering performance.

DETAILED DESCRIPTION

Embodiments of the present invention recognize that improvements may be made to data clustering techniques that can prevent additional processing by performing incremental data clustering based on a major cluster period and a minor cluster period that establishes continuity of data topics within the minor cluster period. Embodiments of the present invention also recognize that by determining non-critical data schedules of data clustering, the non-critical period can be removed from the analysis, improving the speed of the analysis in addition to reducing storage requirements. Implementation of embodiments of the invention may take a variety of forms, and exemplary implementation details are discussed subsequently with reference to the Figures.

Figure 1:
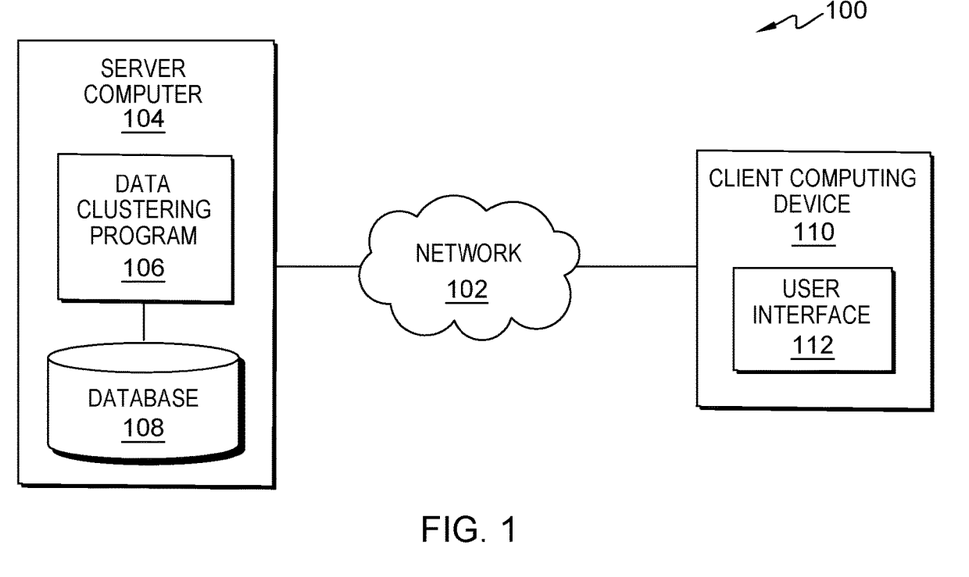
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104 and client computing device 110 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between server computer 104, client computing device 110, and other computing devices (not shown) within distributed data processing environment 100. Distributed data processing environment 100 may be implemented in computing environment 300 shown in FIG. 3.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, an edge device, a containerized workload, or any programmable electronic device capable of communicating with client computing device 110 and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes data clustering program 106 and database 108. Server computer 104 may include internal and external hardware components, as depicted and described in further detail with respect to computer 301 of FIG. 3.

Data clustering program 106 provides a method of dynamic data clustering based on a major cluster period that changes by a minor cluster period. The dynamic clustering can be considered a gaming mode methodology, where data clustering program 106 changes the length of the minor cluster period based on a detected level of similarity in order to preserve continuity of the data analysis and cluster topics. An advantage of using data clustering program 106 is that by comparing related group names and topic details of data clustered over a major cluster period to related group names and topic details of data clustered over a major-to-minor cluster period is the ability to establish a continuity of topics, since within the minor cluster period the change in topics may be minimal. In an embodiment, data clustering program 106 is an extension of an ELT mechanism in a data warehousing context that uses data clustering as the context for data analysis.

Data clustering program 106 receives definitions of both a major cluster period and a minor cluster period. Data clustering program 106 receives continuous data flow. Data clustering program 106 determines whether clustering has been performed on the current data flow previously, and, if not, then data clustering program 106 clusters the data per the initial major cluster period definition. If data clustering program 106 determines clustering has been performed previously, then data clustering program 106 determines whether a minor cluster period is present. If data clustering program 106 determines a minor cluster period is not present, then data clustering program 106 clusters the data per the initial minor cluster period definition. If data clustering program 106 determines a minor cluster period is present, then data clustering program 106 clusters the data per the current minor cluster period. Data clustering program 106 performs a topic similarity check and determines whether the similarity meets a minimum threshold. If data clustering program 106 determines that the similarity does not meet the minimum threshold, then data clustering program 106 increases the minor cluster period. Responsive to increasing the minor cluster period, or if data clustering program 106 determines the similarity does meet the minimum threshold, then data clustering program 106 determines whether the similarity exceeds a maximum threshold. If data clustering program 106 determines the similarity does exceed the maximum threshold, then data clustering program 106 decreases the minor cluster period. Responsive to decreasing the minor cluster period, or if data clustering program 106 determines the similarity does not exceed the maximum threshold, then data clustering program 106 determines whether there is additional data flow. If data clustering program 106 determines there is additional data flow, then data clustering program 106 returns to receiving the continuous data flow, otherwise data clustering program 106 completes execution. Data clustering program 106 is depicted and described in further detail with respect to FIG. 2.

In the depicted embodiment, database 108 resides on server computer 104. In another embodiment, database 108 may reside elsewhere within distributed data processing environment 100, provided that data clustering program 106 has access to database 108, via network 102. A database is an organized collection of data. Database 108 can be implemented with any type of storage device capable of storing data and configuration files that can be accessed and utilized by data clustering program 106 such as a database server, a hard disk drive, or a flash memory. Database 108 stores information used by and generated by data clustering program 106. Database 108 stores an initial major cluster period definition and an initial minor cluster period definition provided by a user of client computing device 110. In addition, database 108 stores a minimum and a maximum threshold for topic similarity/variation provided by the user of client computing device 110. Database 108 also stores data received from a continuous data flow including cluster topics. Further, database 108 stores changes to the initial major and minor cluster period definitions made by data clustering program 106.

The present invention may contain various accessible data sources, such as database 108, that may include personal data, content, or information the user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Data clustering program 106 enables the authorized and secure processing of personal data. Data clustering program 106 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Data clustering program 106 provides information regarding personal data and the nature (e.g., type, scope, purpose, duration, etc.) of the processing. Data clustering program 106 provides the user with copies of stored personal data. Data clustering program 106 allows the correction or completion of incorrect or incomplete personal data. Data clustering program 106 allows the immediate deletion of personal data.

Client computing device 110 can be one or more of a laptop computer, a tablet computer, a smart phone, smart watch, a smart speaker, or any programmable electronic device capable of communicating with various components and devices within distributed data processing environment 100, via network 102. Client computing device 110 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In an embodiment, the wearable computer may be in the form of a smart watch. In one embodiment, the wearable computer may be in the form of a head mounted display (HMD). The HMD may take the form-factor of a pair of glasses, such as augmented reality (AR) glasses, which is a device for viewing mixed reality and/or augmented reality scenarios. In the embodiment where the HMD is a pair of AR glasses, the AR glasses can capture eye gaze information from a gaze point tracker, such as a camera associated with client computing device 110. In general, client computing device 110 represents one or more programmable electronic devices or combination of programmable electronic devices capable of executing machine readable program instructions and communicating with other computing devices (not shown) within distributed data processing environment 100 via a network, such as network 102. Client computing device 110 includes an instance of user interface 112.

User interface 112 provides an interface between data clustering program 106 on server computer 104 and a user of client computing device 110. In one embodiment, user interface 112 is mobile application software. Mobile application software, or an "app," is a computer program designed to run on smart phones, tablet computers and other mobile devices. In one embodiment, user interface 112 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In an embodiment, user interface 112 enables a user of client computing device 110 to input data to be used by data clustering program 106, such as initial definitions of major and minor cluster periods as well as minimum and maximum thresholds of similarity. In an embodiment, user interface 112 also enables a user of client computing device 110 to instruct data clustering program 106 to determine the initial definitions of major and minor cluster periods from historical data.

Figure 2:
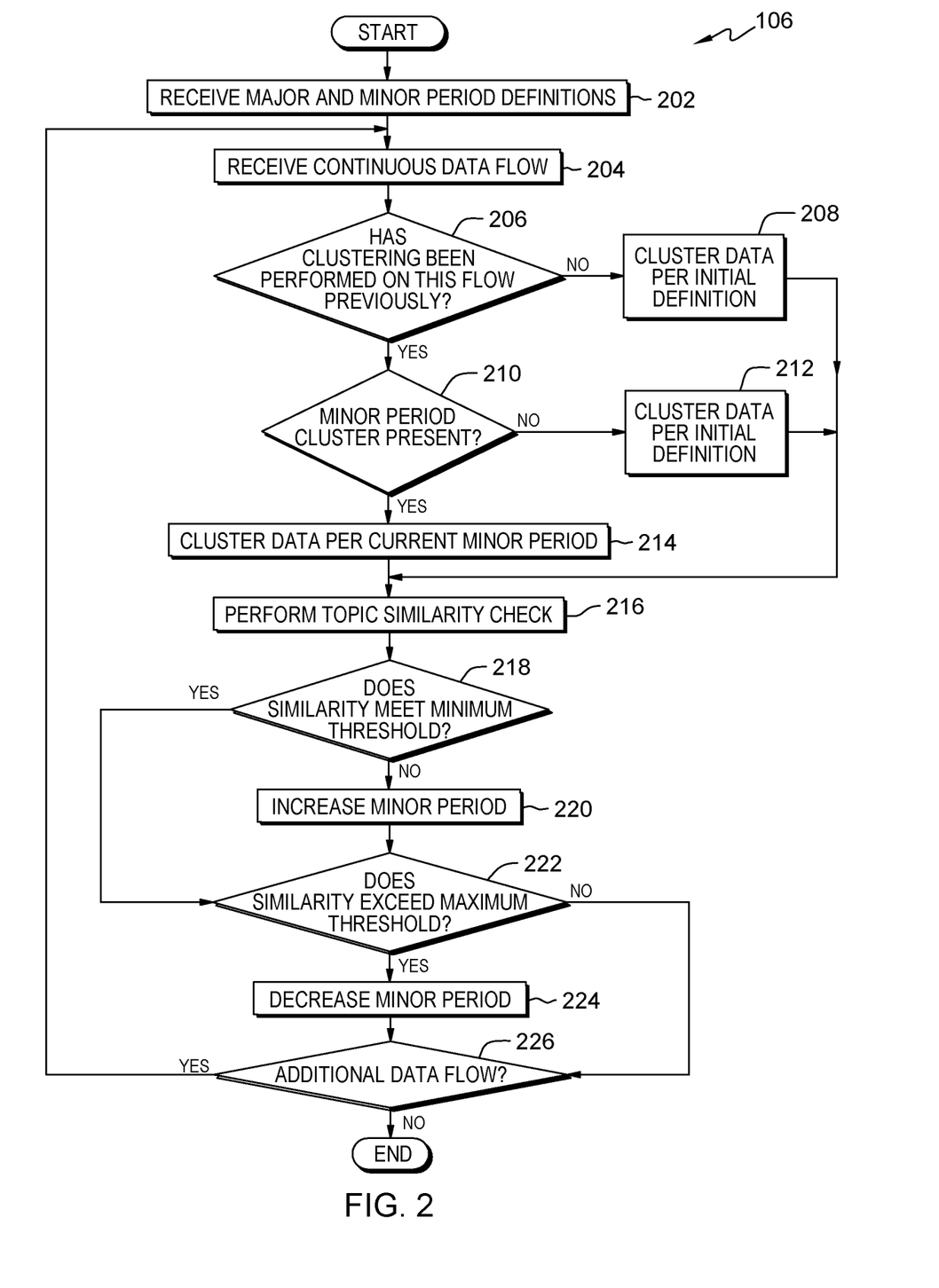
FIG. 2 is a flowchart depicting operational steps of a data clustering program, on a server computer within the distributed data processing environment of FIG. 1, for incremental clustering of continuous flow data streams to preserve data continuity, in accordance with an embodiment of the present invention.

FIG. 2 is a flowchart depicting operational steps of data clustering program 106, on server computer 104 within distributed data processing environment 100 of FIG. 1, for incremental clustering of continuous flow data streams to preserve data continuity, in accordance with an embodiment of the present invention.

Data clustering program 106 receives definitions of a major cluster period and a minor cluster period (step 202). In an embodiment, a data administrator or steward provides the initial definitions of cluster periods. As used herein, a major cluster period is the overall period of time for which data clustering program 106 clusters incoming streaming data. As used herein, a minor cluster period is a subset of the major cluster period and is used to incrementally change the major cluster period, i.e., subtracted from the beginning of the major cluster period and added to the end of the major cluster period. For example, if the initial definition of a major cluster period is one month and the initial definition of a minor cluster period is 24 hours, then the initial major cluster period may be from June $1^{st}$ to June $30^{th}$. Continuing the example, after incrementing the major cluster period by the minor cluster period, the next clustering period is from June $2^{nd}$ to July $1^{st}$. In an embodiment, data clustering program 106 receives the definitions from the data administrator, i.e., the user of client computing device 110, via user interface 112. In another embodiment, the user of client computing device 110 stores the initial definitions of major cluster period and minor cluster period in database 108, and data clustering program 106 retrieves the initial definitions from database 108.

In another embodiment, data clustering program 106 generates the initial definitions of a major cluster period and/or a minor cluster period based on historical learning and/or the context of the data for which the clusters are analyzed. In an embodiment, when a new application of data clustering program 106 is needed for a new client, data clustering program 106 performs a simple similarity check on metadata of the new incoming data stream to determine whether there is a similar context between the client of the new data stream and a client of a previous application of data clustering program 106. In an embodiment, data clustering program 106 copies the initial definitions from a similar application and, after a period of learning, adjusts the definitions as needed to maintain continuity of the data analysis. In the embodiment, data clustering program 106 may receive changes to the generated initial definitions from the user of client computing device 110, via user interface 112. In another embodiment, a data administrator instructs data clustering program 106 to determine initial definitions for a major cluster period and a minor cluster period. For example, if an administrator indicates that the client for which the initial definitions will be applied is similar to another client for which data clustering program 106 has performed dynamic clustering in the past, then data clustering program 106 predicts a best fit definition for a major cluster period and for a minor cluster period for the new client based on the previous definitions for the similar client.

Data clustering program 106 receives continuous data flow (step 204). In an embodiment, as would be recognized by a person of skill in the art, data clustering program 106 receives a continuous flow of data for analysis. For example, if data clustering program 106 is integrated into an ELT process, then data clustering program 106 continuously receives data from one or more of databases, files, Software as a Service (SaaS) applications, application events, etc.

Data clustering program 106 determines whether clustering has been performed on the current data flow previously (decision block 206). Topic clusters are groups of related content that collectively cover a broad subject area. In an embodiment, data clustering program 106 analyzes the source of the current continuous data flow and determines whether data clustering program 106 previously performed clustering on this data flow.

If data clustering program 106 determines clustering has not been performed on the current data flow previously ("no" branch, decision block 206), then data clustering program 106 clusters the data per the initial major cluster period definition (step 208). In an embodiment, if data clustering program 106 has not performed clustering on the incoming data flow before, then data clustering program 106 performs clustering on the data corresponding to the initial definition of the major cluster period received in step 202. Continuing the previous example, if the initial definition of the major cluster period is one month, then data clustering program 106 clusters the data received from June 1st through June 30th.

If data clustering program 106 determines clustering has been performed previously ("yes" branch, decision block 206), then data clustering program 106 determines whether a minor cluster period is present (decision block 210). In an embodiment, subsequent to determining that data clustering program 106 has performed clustering on the continuous data flow, data clustering program 106 determines whether a minor cluster period is present in the data, i.e., data clustering program 106 determines the interval at which data clustering program 106 clustered the data previously. For example, if the major cluster period is one month, then data clustering program 106 may look to see if previous clustering was only performed on data that was received between the first day of a month and the last day of the month.

If data clustering program 106 determines a minor cluster period is not present, ("no" branch, decision block 210), then data clustering program 106 clusters the data per the initial minor cluster period definition (step 212). In an embodiment, if data clustering program 106 determines that the incoming data flow has not been clustered according to a minor cluster period previously, then data clustering program 106 clusters the data per the initial definition of the minor cluster period received in step 202.

If data clustering program 106 determines a minor cluster period is present ("yes" branch, decision block 210), then data clustering program 106 clusters the data per the current minor cluster period (step 214). In an embodiment, once data clustering program 106 has begun clustering the current continuous data flow with the pre-defined major cluster period and the initially defined minor cluster period, data clustering program 106 clusters the incoming data with the current minor cluster period. Continuing the previous example, if the major cluster period is one month and the initial minor cluster period is 24 hours, then data clustering program 106, increments the data collection period by the minor cluster period and clusters the data received from June 2nd through July 1st. As will be discussed below, data clustering program 106 may change the current minor cluster period based on one or more criteria.

Data clustering program 106 performs a topic similarity check (step 216). In an embodiment, once data clustering program 106 has begun the data clustering process, data clustering program 106 compares the topics of the clusters of one cluster period to the topics of the clusters from the subsequent cluster period to determine any variations occurring in the topics over time. For example, if topic 1, topic 2, and topic 3 are present in a first cluster period and in a subsequent cluster period, then data clustering program 106 determines that the clusters are similar. As would be recognized by a person of skill in the art, data clustering program 106 may use one or more known techniques for determining similarity between clusters. For example, data clustering program 106 may use a text comparison technique, such as a fuzzy comparison.

Data clustering program 106 determines whether the similarity meets a minimum threshold (decision block 218). In an embodiment, a measurement of similarity is a number of dissimilar topics found in the similarity check. In another embodiment, the measurement of similarity may be a ratio or percentage of dissimilar topics compared to the total number of topics. In an embodiment, a user of client computing device 110 stores a minimum similarity threshold in database 108, via user interface 112. For example, if the minimum threshold of similarity is two dissimilar topics, then data clustering program 106 determines whether at least two of the topics of the first cluster period are dissimilar from the topics of the second cluster period. Continuing the previous example, if, in addition to topic 1, topic 2, and topic 3, data clustering program 106 determines there are also topic 4 and topic 5 in the first cluster period, but topic 4 and topic 5 are not found in the second cluster period, then data clustering program 106 determines that the second cluster period meets the minimum similarity threshold of two dissimilar topics.

If data clustering program 106 determines that the similarity does not meet the minimum threshold ("no" branch, decision block 218), then data clustering program 106 increases the minor cluster period (step 220). In an embodiment, if data clustering program 106 determines the similarity between two periods of clustering does not meet the minimum threshold, then data clustering program 106 increases the minor cluster period in order to achieve the minimum variation between cluster periods. Continuing the previous example, if data clustering program 106 does not find any variations in topics between the first cluster period and the second cluster period, then data clustering program 106 changes the minor cluster period from 24 hours to 48 hours to provide more data in each cluster period, which in turn provides more variability in the data. Thus, subsequent clustering will use the increased minor cluster period.

In an embodiment, data clustering program 106 determines whether there is a portion of a data flow schedule that is noncritical, i.e., not influencing the cluster analysis, based on the variations in topics. In the embodiment, data clustering program 106 analyzes data by, for example, time of day or day of the week details of minor cluster periods and cluster topic variations. For example, data clustering program 106 may determine that clustering of data produced on Sundays always contributes to topic variations exceeding the minimum threshold of similarity. In another example, data clustering program 106 may determine that clustering of data produced between 3:00 am and 5:00 am every day contributes to topic variations exceeding the minimum threshold of similarity. In the embodiment, data clustering program 106 labels such data as noncritical and removes the data set from the gaming mode methodology. An advantage of removing noncritical data is that it improves clustering performance.

Responsive to increasing the minor cluster period, or if data clustering program 106 determines the similarity does meet the minimum threshold ("yes" branch, decision block 218), then data clustering program 106 determines whether the similarity exceeds a maximum threshold (decision block 222). In an embodiment, a user of client computing device 110 stores a maximum similarity threshold in database 108, via user interface 112. For example, if the maximum threshold of similarity is four dissimilar topics, then data clustering program 106 determines whether five or more of the topics of the first cluster period are dissimilar from the topics of the second cluster period. Continuing the previous example, if data clustering program 106 determines topic 1, topic 2, topic 3, topic 4, and topic 5 are in the first cluster period and, in addition to topic 1, topic 2, and topic 3, data clustering program 106 determines topic 6, topic 7, and topic 8 in the second cluster period, then data clustering program 106 determines that the second cluster period exceeds the maximum similarity threshold of four dissimilar topics.

If data clustering program 106 determines the similarity does exceed the maximum threshold ("yes" branch, decision block 222), then data clustering program 106 decreases the minor cluster period (step 224). In an embodiment, if data clustering program 106 determines the similarity between two periods of clustering exceeds the maximum threshold, then data clustering program 106 decreases the minor cluster period in order to reduce the variation between cluster periods. Continuing the previous example, if data clustering program 106 finds significant variations in topics between the first cluster period and the second cluster period, i.e., greater than the maximum threshold, then data clustering program 106 changes the minor cluster period from 24 hours to 12 hours to provide less data in each cluster period, which in turn provides less variability in the data. Thus, subsequent clustering will use the decreased minor cluster period. By making gaming mode adjustments, i.e., dynamically adjusting the minor cluster period based on similarity of cluster topics, data clustering program 106 has the advantage of maintaining continuity of data and common topics by ensuring variations between clusters will be minimal within a minor cluster period but allowing enough variation to enable a meaningful analysis.

In an embodiment, data clustering program 106 stores the current minor cluster period definition in database 108. In an embodiment, data clustering program 106 stores the cluster topics in database 108 after each clustering process. An advantage of storing the cluster topics is that it enables the enterprise associated with the data to determine statistical trends or patterns, as well as any anomalies, with the incoming data stream.

Responsive to decreasing the minor cluster period, or if data clustering program 106 determines the similarity does not exceed the maximum threshold ("no" branch, decision block 222), then data clustering program 106 determines whether there is additional data flow (decision block 226). In an embodiment, data clustering program 106 continues to process and cluster data from the continuous flow of data until the flow of data ends. If data clustering program 106 determines there is additional data flow ("yes" branch, decision block 226), then data clustering program 106 returns to step 204 to continue receiving the continuous data flow. If data clustering program 106 determines there is no additional data flow ("no" branch, decision block 226), then data clustering program 106 completes execution.

Figure 3:
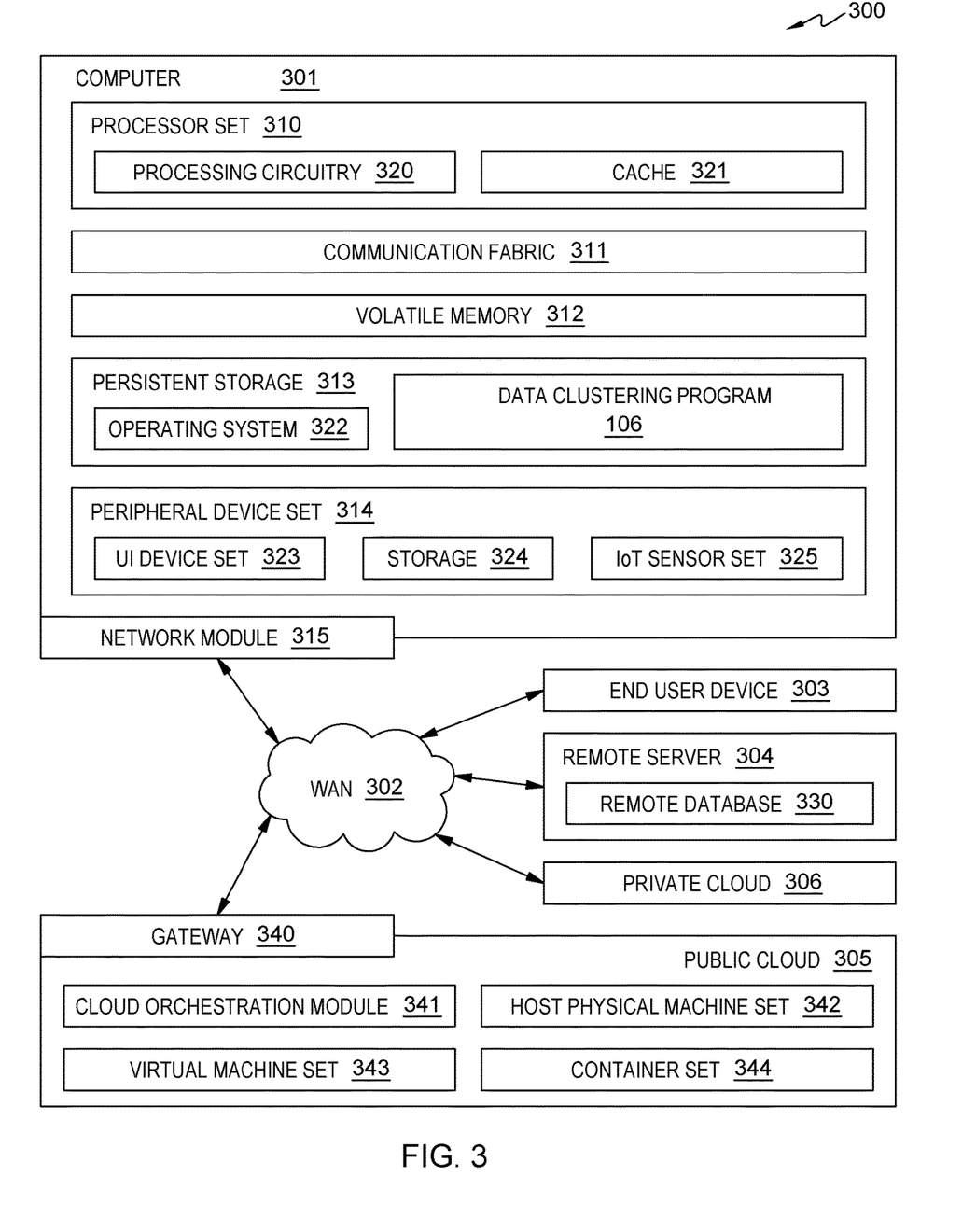
FIG. 3 illustrates an exemplary computer environment in which aspects of one or more of the illustrative embodiments may be implemented, and at least some of the computer code involved in performing the inventive methods may be executed, in accordance with an embodiment of the present invention.

FIG. 3 is an example diagram of a distributed data processing environment in which aspects of one or more of the illustrative embodiments may be implemented, and at least some of the computer code involved in performing the inventive methods may be executed, in accordance with an embodiment of the present invention, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Computing environment 300 contains an example of an environment for the execution of at least some of the computer code involved in performing the inventive methods, such as data clustering program 106 for clustering continuous flow data streams to preserve data continuity. In addition to data clustering program 106, computing environment 300 includes, for example, computer 301, wide area network (WAN) 302, end user device (EUD) 303, remote server 304, public cloud 305, and private cloud 306. In this embodiment, computer 301 includes processor set 310 (including processing circuitry 320 and cache 321), communication fabric 311, volatile memory 312, persistent storage 313 (including operating system 322 and data clustering program 106, as identified above), peripheral device set 314 (including user interface (UI), device set 323, storage 324, and Internet of Things (IoT) sensor set 325), and network module 315. Remote server 304 includes remote database 330. Public cloud 305 includes gateway 340, cloud orchestration module 341, host physical machine set 342, virtual machine set 343, and container set 344.

Computer 301 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 330. As is well understood in the art of computer technology, and depending upon the technology, performance of a computer-implemented method may be distributed among multiple computers and/or between multiple locations. On the other hand, in this presentation of computing environment 300, detailed discussion is focused on a single computer, specifically computer 301, to keep the presentation as simple as possible. Computer 301 may be located in a cloud, even though it is not shown in a cloud in FIG. 3. On the other hand, computer 301 is not required to be in a cloud except to any extent as may be affirmatively indicated.

Processor set 310 includes one, or more, computer processors of any type now known or to be developed in the future. Processing circuitry 320 may be distributed over multiple packages, for example, multiple, coordinated integrated circuit chips. Processing circuitry 320 may implement multiple processor threads and/or multiple processor cores. Cache 321 is memory that is located in the processor chip package(s) and is typically used for data or code that should be available for rapid access by the threads or cores running on processor set 310. Cache memories are typically organized into multiple levels depending upon relative proximity to the processing circuitry. Alternatively, some, or all, of the cache for the processor set may be located "off chip." In some computing environments, processor set 310 may be designed for working with qubits and performing quantum computing.

Computer readable program instructions are typically loaded onto computer 301 to cause a series of operational steps to be performed by processor set 310 of computer 301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 321 and the other storage media discussed below. The program instructions, and associated data, are accessed by processor set 310 to control and direct performance of the inventive methods. In computing environment 300, at least some of the instructions for performing the inventive methods may be stored in data clustering program 106 in persistent storage 313.

Communication fabric 311 is the signal conduction paths that allow the various components of computer 301 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 312 is any type of volatile memory now known or to be developed in the future. Examples include dynamic type random access memory (RAM) or static type RAM. Typically, the volatile memory is characterized by random access, but this is not required unless affirmatively indicated. In computer 301, the volatile memory 312 is located in a single package and is internal to computer 301, but, alternatively or additionally, the volatile memory may be distributed over multiple packages and/or located externally with respect to computer 301.

Persistent storage 313 is any form of non-volatile storage for computers that is now known or to be developed in the future. The non-volatility of this storage means that the stored data is maintained regardless of whether power is being supplied to computer 301 and/or directly to persistent storage 313. Persistent storage 313 may be a read only memory (ROM), but typically at least a portion of the persistent storage allows writing of data, deletion of data and re-writing of data. Some familiar forms of persistent storage include magnetic disks and solid-state storage devices. Operating system 322 may take several forms, such as various known proprietary operating systems or open-source Portable Operating System Interface type operating systems that employ a kernel. The code included in data clustering program 106 typically includes at least some of the computer code involved in performing the inventive methods.

Peripheral device set 314 includes the set of peripheral devices of computer 301. Data communication connections between the peripheral devices and the other components of computer 301 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 323 may include components such as a display screen, speaker, microphone, wearable devices (such as goggles and smart watches), keyboard, mouse, printer, touchpad, game controllers, and haptic devices. Storage 324 is external storage, such as an external hard drive, or insertable storage, such as an SD card. Storage 324 may be persistent and/or volatile. In some embodiments, storage 324 may take the form of a quantum computing storage device for storing data in the form of qubits. In embodiments where computer 301 is required to have a large amount of storage (for example, where computer 301 locally stores and manages a large database) then this storage may be provided by peripheral storage devices designed for storing very large amounts of data, such as a storage area network (SAN) that is shared by multiple, geographically distributed computers. IoT sensor set 325 is made up of sensors that can be used in Internet of Things applications. For example, one sensor may be a thermometer and another sensor may be a motion detector.

Network module 315 is the collection of computer software, hardware, and firmware that allows computer 301 to communicate with other computers through WAN 302. Network module 315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 315 are performed on the same physical hardware device. In other embodiments (for example, embodiments that utilize software-defined networking (SDN)), the control functions and the forwarding functions of network module 315 are performed on physically separate devices, such that the control functions manage several different network hardware devices. Computer readable program instructions for performing the inventive methods can typically be downloaded to computer 301 from an external computer or external storage device through a network adapter card or network interface included in network module 315.

WAN 302 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 303 is any computer system that is used and controlled by an end user (for example, a customer of an enterprise that operates computer 301) and may take any of the forms discussed above in connection with computer 301. EUD 303 typically receives helpful and useful data from the operations of computer 301. For example, in a hypothetical case where computer 301 is designed to provide a recommendation to an end user, this recommendation would typically be communicated from network module 315 of computer 301 through WAN 302 to EUD 303. In this way, EUD 303 can display, or otherwise present, the recommendation to an end user. In some embodiments, EUD 303 may be a client device, such as thin client, heavy client, mainframe computer, desktop computer and so on.

Remote server 304 is any computer system that serves at least some data and/or functionality to computer 301. Remote server 304 may be controlled and used by the same entity that operates computer 301. Remote server 304 represents the machine(s) that collect and store helpful and useful data for use by other computers, such as computer 301. For example, in a hypothetical case where computer 301 is designed and programmed to provide a recommendation based on historical data, then this historical data may be provided to computer 301 from remote database 330 of remote server 304.

Public cloud 305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 305 is performed by the computer hardware and/or software of cloud orchestration module 341. The computing resources provided by public cloud 305 are typically implemented by virtual computing environments that run on various computers making up the computers of host physical machine set 342, which is the universe of physical computers in and/or available to public cloud 305. The virtual computing environments (VCEs) typically take the form of virtual machines from virtual machine set 343 and/or containers from container set 344. It is understood that these VCEs may be stored as images and may be transferred among and between the various physical machine hosts, either as images or after instantiation of the VCE. Cloud orchestration module 341 manages the transfer and storage of images, deploys new instantiations of VCEs and manages active instantiations of VCE deployments. Gateway 340 is the collection of computer software, hardware, and firmware that allows public cloud 305 to communicate through WAN 302.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 306 is similar to public cloud 305, except that the computing resources are only available for use by a single enterprise. While private cloud 306 is depicted as being in communication with WAN 302, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 305 and private cloud 306 are both part of a larger hybrid cloud.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The foregoing descriptions of the various embodiments of the present invention have been presented for purposes of illustration and example but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    receiving, by one or more computer processors, a definition of a first major cluster period of time and a definition of a first minor cluster period of time, wherein the first minor cluster period of time is used to incrementally change the first major cluster period of time, wherein the definition of the first major cluster period of time is an overall interval of time for which clustering of the continuous stream of data is performed and the definition of the first minor cluster period of time is a subset of the first major cluster period of time that is subtracted from a beginning of the first major cluster period of time and added to an end of the first major cluster period of time to create a second major cluster period of time;
    receiving, by one or more computer processors, a continuous stream of data;
        clustering, by one or more computer processors, the continuous stream of data, based on the definition of the first major cluster period of time and on the definition of the first minor cluster period of time;
        determining, by one or more computer processors, a similarity between a first data cluster and a second data cluster, wherein the second data cluster occurs after the first minor cluster period of time;
        determining, by one or more computer processors, whether the similarity meets a pre-defined minimum threshold of similarity; and
        responsive to determining the similarity does not meet the pre-defined minimum threshold of similarity, increasing, by one or more computer processors, the first minor cluster period of time to a second minor cluster period of time.

2. The computer-implemented method of claim 1, further comprising:
    responsive to determining the similarity meets the pre-defined minimum threshold of similarity, decreasing, by one or more computer processors, the first minor cluster period of time to a third minor cluster period of time.

3. The computer-implemented method of claim 1, wherein determining the similarity between the first data cluster and the second data cluster further comprises:
    measuring, by one or more computer processors, a number of dissimilar topics found between the first data cluster and the second data cluster.

4. The computer-implemented method of claim 1, further comprising:
    based on the determined similarity between the first data cluster and the second data cluster, determining, by one or more computer processors, a portion of the continuous stream of data that does not influence clustering;
    determining, by one or more computer processors, the portion of the continuous stream of data that does not influence the clustering is noncritical; and
    removing, by one or more computer processors, noncritical data from a dataset.

5. The computer-implemented method of claim 1, wherein a data cluster is a group of related content that collectively covers a broad subject area.

6. The computer-implemented method of claim 1, further comprising:
storing, by one or more computer processors, the second minor cluster period of time.

7. A computer program product comprising:
one or more computer readable storage media;
program instructions, stored on at least one of the one or more computer readable storage media, to receive a definition of a first major cluster period of time and a definition of a first minor cluster period of time, wherein the first minor cluster period of time is used to incrementally change the first major cluster period of time, wherein the definition of the first major cluster period of time is an overall interval of time for which clustering of the continuous stream of data is performed and the definition of the first minor cluster period of time is a subset of the first major cluster period of time that is subtracted from a beginning of the first major cluster period of time and added to an end of the first major cluster period of time to create a second major cluster period of time;
program instructions, stored on at least one of the one or more computer readable storage media, to receive a continuous stream of data;
program instructions, stored on at least one of the one or more computer readable storage media, to cluster the continuous stream of data, based on the definition of the first major cluster period of time and on the definition of the first minor cluster period of time;
program instructions, stored on at least one of the one or more computer readable storage media, to determine a similarity between a first data cluster and a second data cluster, wherein the second data cluster occurs after the first minor cluster period of time;
program instructions, stored on at least one of the one or more computer readable storage media, to determine whether the similarity meets a pre-defined minimum threshold of similarity; and
responsive to determining the similarity does not meet the pre-defined minimum threshold of similarity, program instructions, stored on at least one of the one or more computer readable storage media, to increase the first minor cluster period of time to a second minor cluster period of time.

8. The computer program product of claim 7, further comprising:
responsive to determining the similarity meets the pre-defined minimum threshold of similarity, program instructions, stored on at least one of the one or more computer readable storage media, to decrease the first minor cluster period of time to a third minor cluster period of time.

9. The computer program product of claim 7, wherein the program instructions to determine the similarity between the first data cluster and the second data cluster comprise:
program instructions, stored on at least one of the one or more computer readable storage media, to measure a number of dissimilar topics found between the first data cluster and the second data cluster.

10. The computer program product of claim 7, further comprising:
based on the determined similarity between the first data cluster and the second data cluster, program instructions, stored on at least one of the one or more computer readable storage media, to determine a portion of the continuous stream of data that does not influence clustering;
program instructions, stored on at least one of the one or more computer readable storage media, to determine the portion of the continuous stream of data that does not influence the clustering is noncritical; and
program instructions, stored on at least one of the one or more computer readable storage media, to remove noncritical data from a dataset.

11. The computer program product of claim 7, wherein a data cluster is a group of related content that collectively covers a broad subject area.

12. The computer program product of claim 7, further comprising:
program instructions, stored on at least one of the one or more computer readable storage media, to store the second minor cluster period of time.

13. A computer system comprising:
one or more computer processors;
one or more computer-readable memories; and
one or more computer readable storage media;
program instructions, stored on at least one of the one or more computer readable storage media for execution by at least one of the one or more computer processors via at least one of the one or more memories, to receive a definition of a first major cluster period of time and a definition of a first minor cluster period of time, wherein the first minor cluster period of time is used to incrementally change the first major cluster period of time, wherein the definition of the first major cluster period of time is an overall interval of time for which clustering of the continuous stream of data is performed and the definition of the first minor cluster period of time is a subset of the first major cluster period of time that is subtracted from a beginning of the first major cluster period of time and added to an end of the first major cluster period of time to create a second major cluster period of time;
program instructions, stored on at least one of the one or more computer readable storage media for execution by at least one of the one or more computer processors via at least one of the one or more memories, to receive a continuous stream of data;
program instructions, stored on at least one of the one or more computer readable storage media for execution by at least one of the one or more computer processors via at least one of the one or more memories, to cluster the continuous stream of data, based on the definition of the first major cluster period of time and on the definition of the first minor cluster period of time;
program instructions, stored on at least one of the one or more computer readable storage media for execution by at least one of the one or more computer processors via at least one of the one or more memories, to determine a similarity between a first data cluster and a second data cluster, wherein the second data cluster occurs after the first minor cluster period of time;
program instructions, stored on at least one of the one or more computer readable storage media for execution by at least one of the one or more computer processors via at least one of the one or more memories, to determine whether the similarity meets a pre-defined minimum threshold of similarity; and
responsive to determining the similarity does not meet the pre-defined minimum threshold of similarity, program instructions, stored on at least one of the one or more computer readable storage media for execution by at least one of the one or more computer processors via at least one of the one or more memories, to increase the first minor cluster period of time to a second minor cluster period of time.

14. The computer system of claim 13, further comprising:
responsive to determining the similarity meets the predefined minimum threshold of similarity, program instructions, stored on at least one of the one or more computer readable storage media for execution by at least one of the one or more computer processors via at least one of the one or more memories, to decrease the first minor cluster period of time to a third minor cluster period of time.

15. The computer system of claim 13, wherein the program instructions to determine the similarity between the first data cluster and the second data cluster comprise:
program instructions, stored on at least one of the one or more computer readable storage media for execution by at least one of the one or more computer processors via at least one of the one or more memories, to measure a number of dissimilar topics found between the first data cluster and the second data cluster.

16. The computer system of claim 13, further comprising:
based on the determined similarity between the first data cluster and the second data cluster, program instructions, stored on at least one of the one or more computer readable storage media for execution by at least one of the one or more computer processors via at least one of the one or more memories, to determine a portion of the continuous stream of data that does not influence clustering;
program instructions, stored on at least one of the one or more computer readable storage media for execution by at least one of the one or more computer processors via at least one of the one or more memories, to determine the portion of the continuous stream of data that does not influence the clustering is noncritical; and
program instructions, stored on at least one of the one or more computer readable storage media for execution by at least one of the one or more computer processors via at least one of the one or more memories, to remove noncritical data from a dataset.

17. The computer system of claim 13, further comprising:
program instructions, stored on at least one of the one or more computer readable storage media for execution by at least one of the one or more computer processors via at least one of the one or more memories, to store the second minor cluster period of time.

* * * * *